United States Patent
Ozeki et al.

(10) Patent No.: US 8,555,667 B2
(45) Date of Patent: Oct. 15, 2013

(54) AIR CONDITIONER FOR VEHICLE

(75) Inventors: Yukio Ozeki, Ashikaga (JP); Toshio Ohashi, Sano (JP); Masato Ono, Sano (JP); Akihiro Tsurushima, Sano (JP)

(73) Assignee: Calsonic Kansei Corporation, Saitama-shi (JP)

( * ) Notice: Subject to any disclaimer, the term of this patent is extended or adjusted under 35 U.S.C. 154(b) by 1163 days.

(21) Appl. No.: 12/094,832

(22) PCT Filed: Nov. 24, 2006

(86) PCT No.: PCT/JP2006/323411
§ 371 (c)(1),
(2), (4) Date: Jul. 16, 2008

(87) PCT Pub. No.: WO2007/061039
PCT Pub. Date: May 31, 2007

(65) Prior Publication Data
US 2009/0241574 A1  Oct. 1, 2009

(30) Foreign Application Priority Data

Nov. 25, 2005 (JP) ................................ P2005-340313

(51) Int. Cl.
*B60H 1/32* (2006.01)
(52) U.S. Cl.
USPC .................................. 62/244; 62/239; 165/42
(58) Field of Classification Search
USPC ..................... 62/239, 244; 454/141, 203–204, 454/160–161; 165/42, 43; 137/861, 865, 137/870; 251/901
See application file for complete search history.

(56) References Cited

U.S. PATENT DOCUMENTS

| 6,453,991 | B1 | 9/2002 | Tsurushima et al. |
| 7,527,551 | B2 * | 5/2009 | Goupil et al. ................. 454/121 |
| 2001/0008148 | A1 * | 7/2001 | Ito et al. .................. 137/625.46 |
| 2002/0189787 | A1 * | 12/2002 | Tsurushima et al. ........... 165/42 |
| 2005/0217295 | A1 * | 10/2005 | Alberternst et al. ............ 62/239 |
| 2005/0227606 | A1 | 10/2005 | Oide |

FOREIGN PATENT DOCUMENTS

| JP | 2001-270317 A | 10/2001 |
| JP | 2001-270320 A | 10/2001 |
| JP | 2004-114913 A | 4/2004 |
| JP | 2005-324778 A | 11/2005 |

* cited by examiner

*Primary Examiner* — Lakiya Rogers
(74) *Attorney, Agent, or Firm* — Foley & Lardner LLP

(57) ABSTRACT

A portion of a draft duct in an air conditioning unit upstream from a heater core is divided into three passages. Each of the divided passages is provided with air mix doors 9a, 9b, and 9c that distribute air into a warm air passage and a cool air passage at a predetermined ratio. The air mix doors 9a and 9b are driven by first slide systems 34a and 34b having drive gears 21a and 21b that mesh with racks 20a and 20b of the air mix doors 9a and 9b, and support shafts 22a and 22b that support the drive gears 21a and 21b. The air mix door 9c is driven by a second slide system 35c having a drive gear 21c that meshes with a rack 20c of the air mix door 9c and that is supported by a support shaft 22c, and a second auxiliary gear 24a that meshes with a first auxiliary gear 24b supported by the support shaft 22c and that is supported by an auxiliary support shaft 25.

10 Claims, 19 Drawing Sheets

FIG. 6
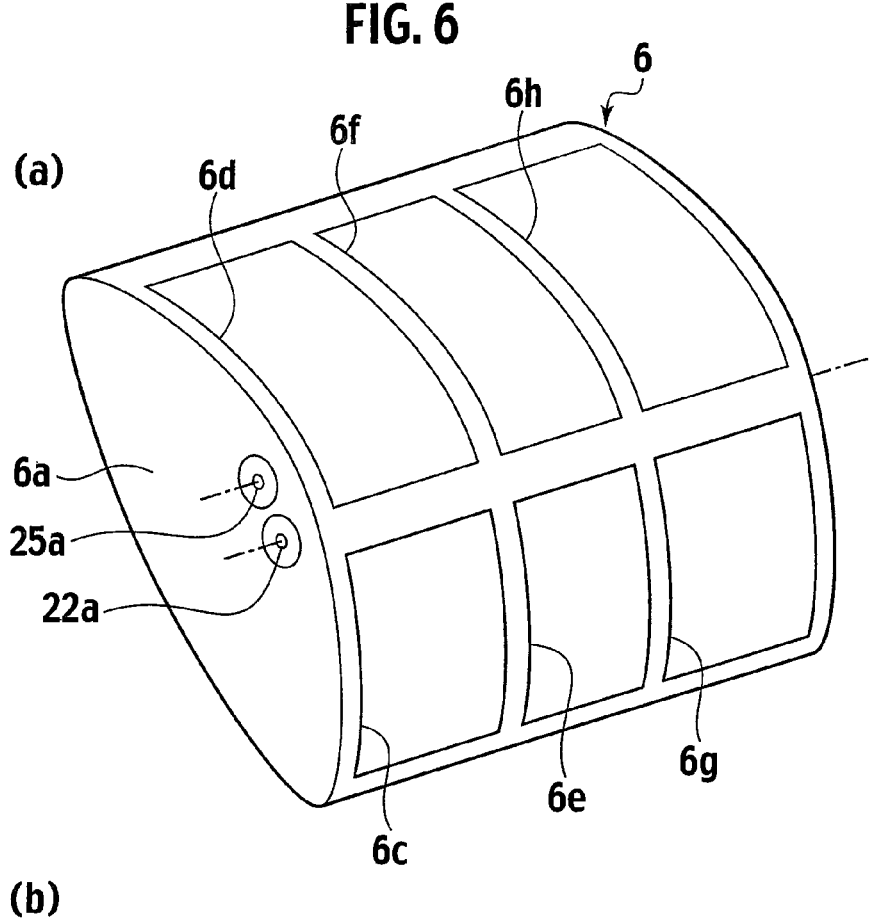
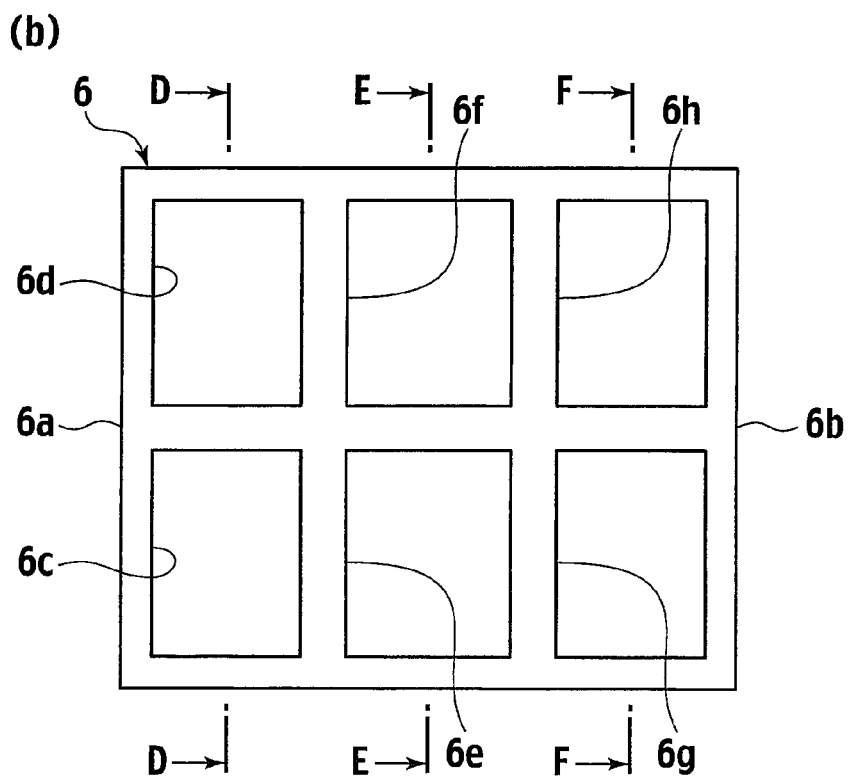

FIG. 11
(a) 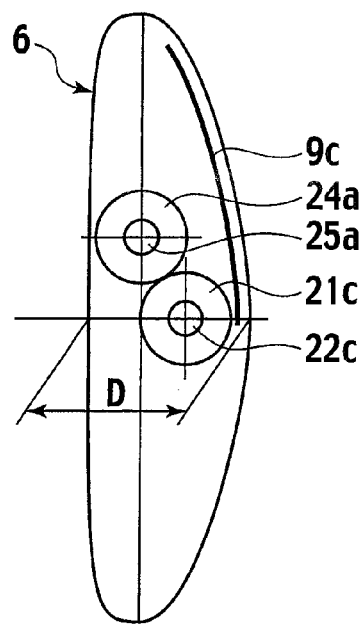
(b) 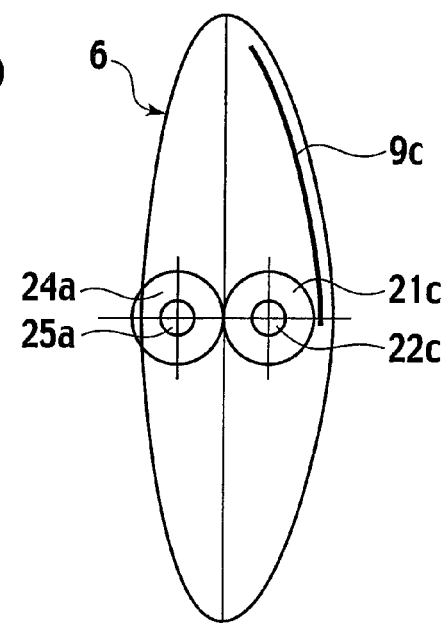

AIR CONDITIONER FOR VEHICLE

TECHNICAL FIELD

The present invention relates to an air conditioner for a vehicle that independently carries out air-conditioning operations in a plurality of areas in a vehicle room, e.g., in a front seat side and in a back seat side.

BACKGROUND ART

Japanese Patent Application Laid-open No. 2004-114913 (hereinafter, "patent document 1") discloses a conventional air conditioner for a vehicle of this kind. According to the patent document 1, in an air conditioning unit 101 of the air conditioner 100 for a vehicle, a blower 103, an evaporator 104, an air mix door box 105, and a heater core 106 are arranged in an inside draft duct 102 in this order from the upstream side in an air-blowing direction as shown in FIG. 1. A portion of the draft duct 102 downstream from the position of the air mix door box 105 (upstream position of the heater core 106) is divided into three in a direction orthogonal to the air-blowing direction. These three divided passages are a left passage for a left front seat, a right passage for a right front seat, and a central passage for a back seat. FIG. 1 is a sectional view at a position of the passage for the left front seat.

As shown in FIG. 2, the air mix door box 105 includes three air mix doors 110a (not shown, not shown) corresponding to the three divided passages, and pairs of upper and lower openings 111a, 111b, 112a, 112b, 113a, and 113b corresponding to the air mix doors 110a (not shown, not shown), respectively. Air is distributed to a warm air passage 114a (not shown, not shown) passing through the heater core 106 and a cool air passage 115a (not shown, not shown) bypassing through the heater core 106 at a desired ratio. The three air mix doors 110a (not shown, not shown) can be driven independently from each other.

Air mix areas ME1 (not shown, not shown) are formed downstream of a warm air passage 114 (not shown, not shown) and a cool air passage 115 (not shown, not shown) of the three divided passages, respectively, and unit blow openings are formed at locations facing the air mix areas ME1 (not shown, not shown). The left front-seat passage is provided with unit blow openings 120, 121, and 122, and selection doors 123, 124, and 125.

In the above-described structure, air that passed through the evaporator 104 is branched into the left front-seat passage, the right front-seat passage, and the back seat passage. The branched air passes through the warm air passage 114a (not shown, not shown) and the cool air passage 115a (not shown, not shown) according to the respective air-distribution ratios of the air mix doors 110a (not shown, not shown). Warm air from the warm air passage 114a (not shown, not shown) and cool air from the cool air passage 115a (not shown, not shown) joins together in the air mix areas ME1 (not shown, not shown), resulting in air heated or cooled to a desired temperature, respectively. Conditioned air having the desired temperature is sent out into the vehicle room through a selected unit blow opening in each passage (unit blow opening 120 in the left front-seat passage (or 121 or 122)). In this way, the air conditioner operations are independently carried out in the front seat left area, the front seat right area, and the back seat area in the vehicle room.

In the conventional example, drive systems of the three air mix doors 110a (not shown, not shown) are constituted in the following manner.

The drive system of the left air mix door 110a for the left front seat includes a rack (not shown) provided on the air mix door 110a, a drive gear 130 that meshes with the rack (not shown), and a first support shaft 131 that supports the drive gear 130 and that projects outward from a left wall 105a of the air mix door box 105. The drive system transmits torque of a first actuator (not shown) via the first support shaft 131.

The drive system of the right air mix door (not shown) for the right front seat includes a rack (not shown) provided on the air mix door (not shown), a drive gear (not shown) that meshes with the rack (not shown), and a second support shaft (not shown) that supports the drive gear (not shown) and projects outward from a right wall (not shown) of the air mix door box 105. The drive system transmits torque of the second actuator (not shown) via this second support shaft (not shown).

The drive system of the central air mix door (not shown) for the back seat includes a rack (not shown) provided on the air mix door (not shown), a drive gear 132 that meshes with the rack (not shown), and a third support shaft 133 that supports the drive gear 132 and that projects outward from a left wall 105a (or right wall) of the air mix door box 105 at a location deviated from the first support shaft 131 and the second support shaft (not shown). The drive system transmits torque of a third actuator (not shown) via the third support shaft 133.

Here, the first support shaft 131 and the second support shaft (not shown) located at left and right positions can be located on the same axis, but the central third support shaft 133 cannot be located on the same axis. Thus, the central drive gear 132 meshes with the rack (not shown) at a location shifted vertically from the left and right drive gears 130 and (not shown), and the third support shaft 133 is shifted vertically from the first and second support shafts 131 and (not shown).

In the conventional air conditioner 100 for a vehicle, the three drive gears 130, (not shown), and 132, and their support shafts 131, (not shown), and 133 are located not on the same axis but at the vertically shifted positions. Therefore, the air mix doors 111a and (not shown) at the left and right positions, the corresponding pairs of upper and lower openings 111a, 111b, 113c, and 113b, the central air mix door (not shown), and the corresponding pair of upper and lower openings 112a and 112b are also located at the vertically shifted positions accordingly. Thus, there is a problem in that vertical sizes of the air mix door box 105 and thus the air conditioner 100 for a vehicle are increased.

Hence, it is an object of the present invention to provide an air conditioner for a vehicle having a reduced size and being capable of independently carrying out air conditioning operations in a plurality of areas in a vehicle room.

DISCLOSURE OF THE INVENTION

To achieve the above object, the invention of claim 1 provides an air conditioner for a vehicle, in which a draft duct in an air conditioning unit is divided into two or more divided passages from upstream of at least a heater core, each of the divided passages includes a warm air passage passing through the heater core, a cool air passage bypassing the heater core, and an air mix door that controls a ratio between an amount of air passing through the warm air passage and an amount of air passing through the cool air passage, the air conditioner including a first slide system having a first drive gear that meshes with a rack provided on the air mix door, and a support shaft that supports the first drive gear, and the first slide system driving the air mix door by rotating the support shaft, and a second slide system having a second drive gear that meshes with a rack provided on the air mix door, a support shaft that supports the second drive gear, a first auxiliary gear supported by the support shaft, a second auxiliary gear that meshes with the first auxiliary gear, and an auxiliary support shaft that supports the second auxiliary gear, and the second slide system driving the air mix door by rotating the auxiliary support shaft, wherein each of the air mix doors is driven by one of the first slide system and the second slide system.

The invention of claim 2 provides the air conditioner for a vehicle according to claim 1, wherein the second drive gear and the first auxiliary gear are integrally formed as one member.

The invention of claim 3 provides the air conditioner for a vehicle according to claim 1, wherein the second drive gear also functions as the first auxiliary gear.

The invention of claim 4 provides the air conditioner for a vehicle according to any one of claims 1 to 3, wherein the second auxiliary gear is placed at a location adjacent to the rack of the air mix door.

The invention of claim 5 provides the air conditioner for a vehicle according to any one of claims 1 to 4, wherein the first drive gear and the second drive gear are provided with teeth, one or some of the teeth are high teeth having greater height.

The invention of claim 6 provides the air conditioner for a vehicle according to any one of claims 1 to 5, wherein the support shaft and the auxiliary support shaft are located such that an axial direction of the support shaft and an axial direction of the auxiliary support shaft are parallel to each other.

BRIEF DESCRIPTION OF THE DRAWINGS

FIG. 6 show an air mix door box according to the first embodiment, where (a) is a perspective view of the air mix door box, and (b) shows the air mix door box as viewed from the vehicle room.

FIG. 11 are schematic diagrams showing positions of auxiliary gears with respect to the drive gear, where (a) is a schematic diagram showing a position of the auxiliary gear with respect to the drive gear of the first embodiment, and (b) is a schematic diagram showing a position of a normal auxiliary gear with respect to the drive gear.

BEST MODE FOR CARRYING OUT THE INVENTION

Embodiments of the present invention will be explained.

First Embodiment

FIGS. 3 to 11 show a first embodiment of the present invention.

An air conditioner 1 for a vehicle is placed substantially at a center of a front portion of a vehicle room. The air conditioner 1 is generally configured by a blower unit (not shown) and an air conditioning unit 2. The blower unit (not shown) sucks outside air or inside air, and sends the air to the air conditioning unit 2. The air conditioning unit 2 conditions the air from the blower unit (not shown) to have a desired temperature, and sends the conditioned air. A structure of the air conditioning unit 2 will be explained in detail.

Figure 1:
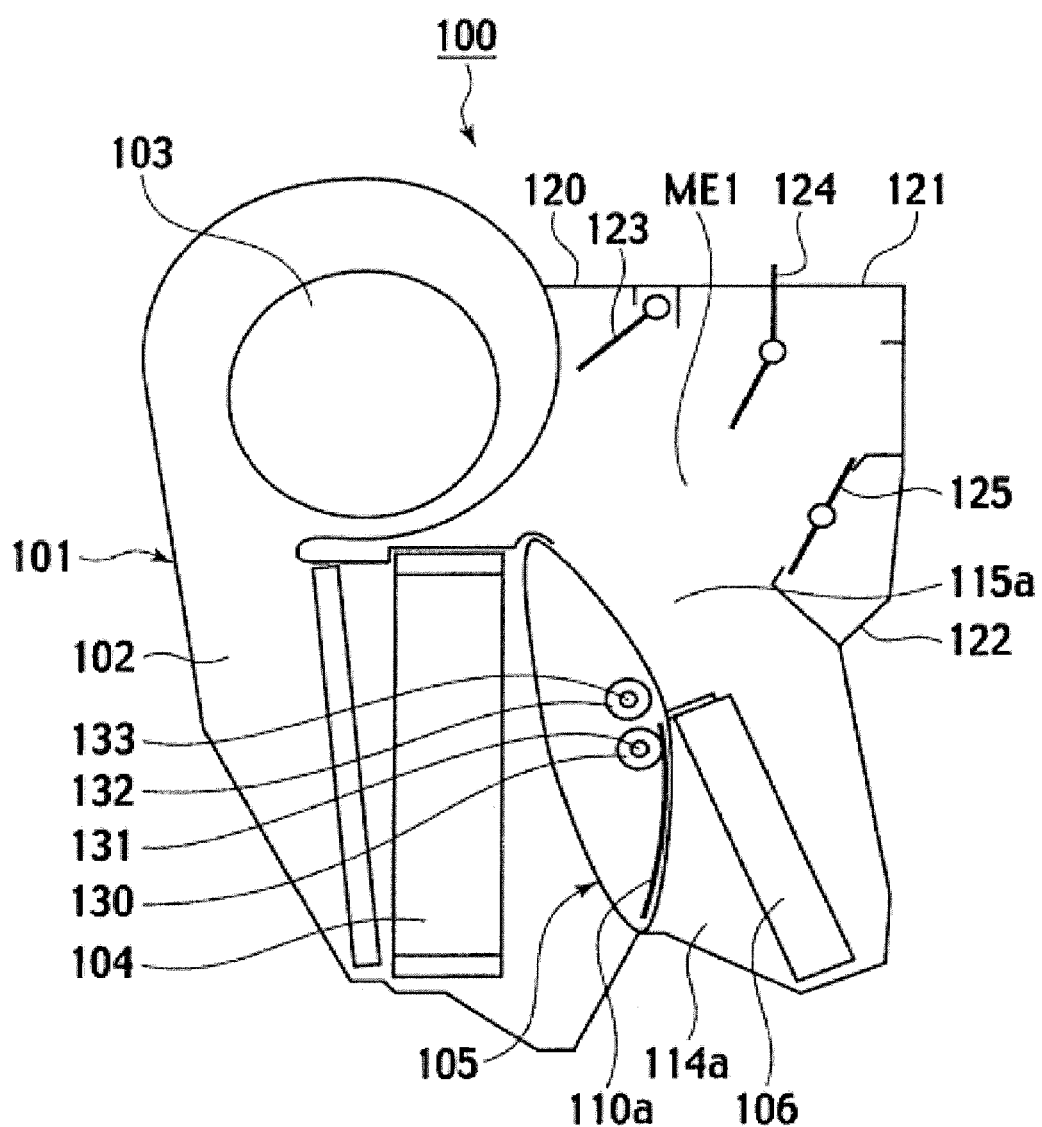
FIG. 1 is a schematic diagram showing a structure of a conventional air conditioner for a vehicle.
Figure 2:
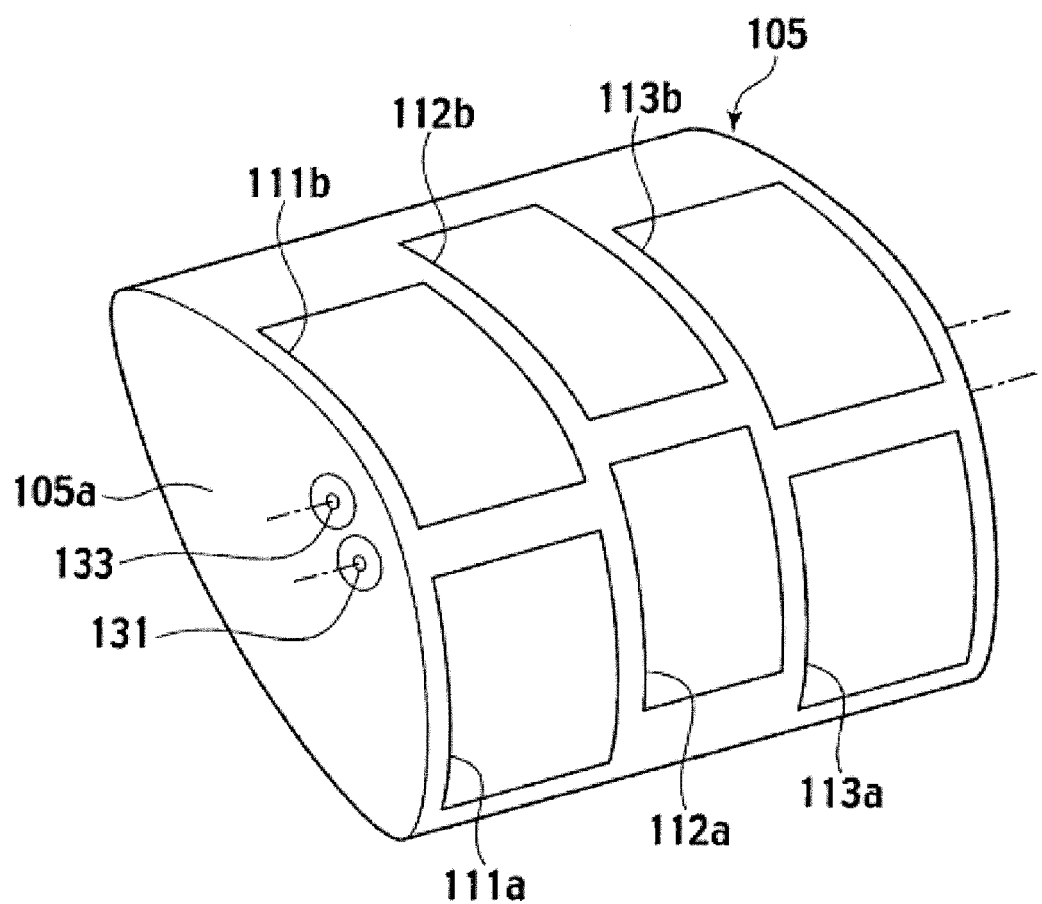
FIG. 2 is a perspective view of an air mix door box of the conventional air conditioner.
Figure 3:
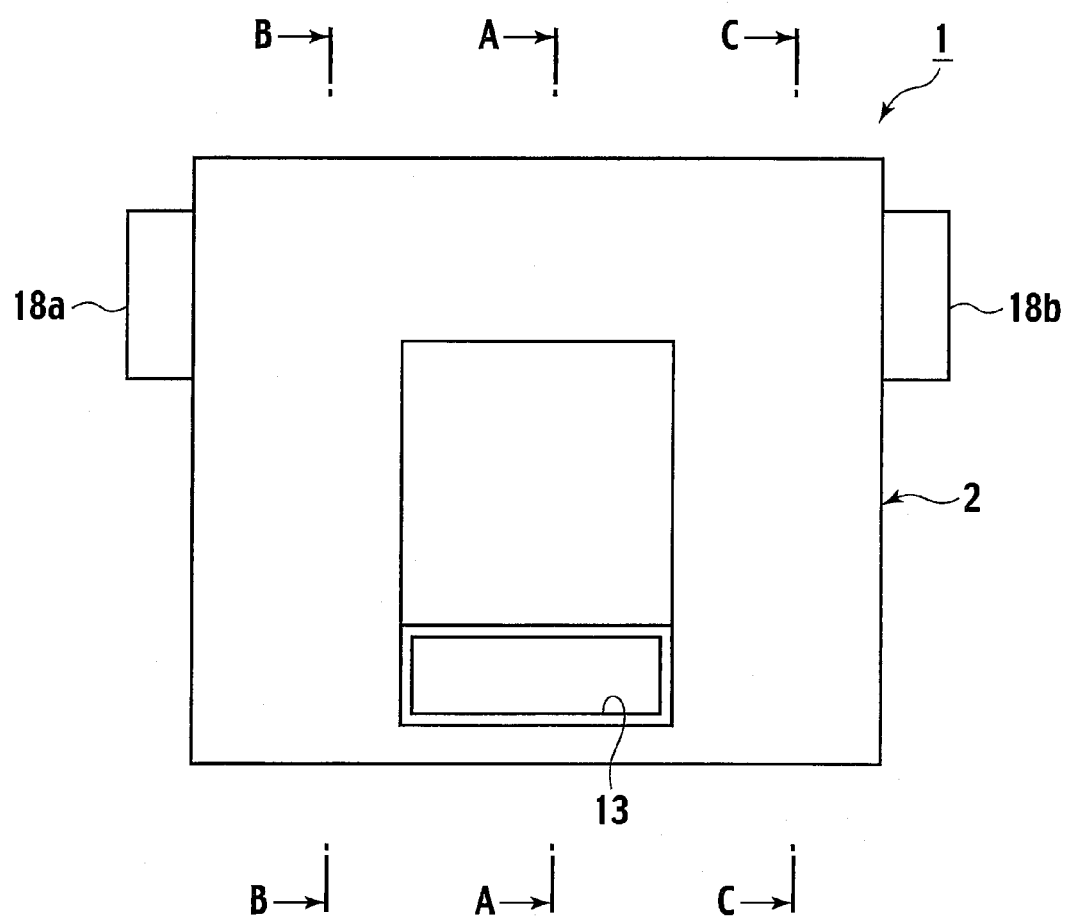
FIG. 3 shows an air conditioning unit according to a first embodiment of the present invention, as viewed from a vehicle room.
Figure 4:
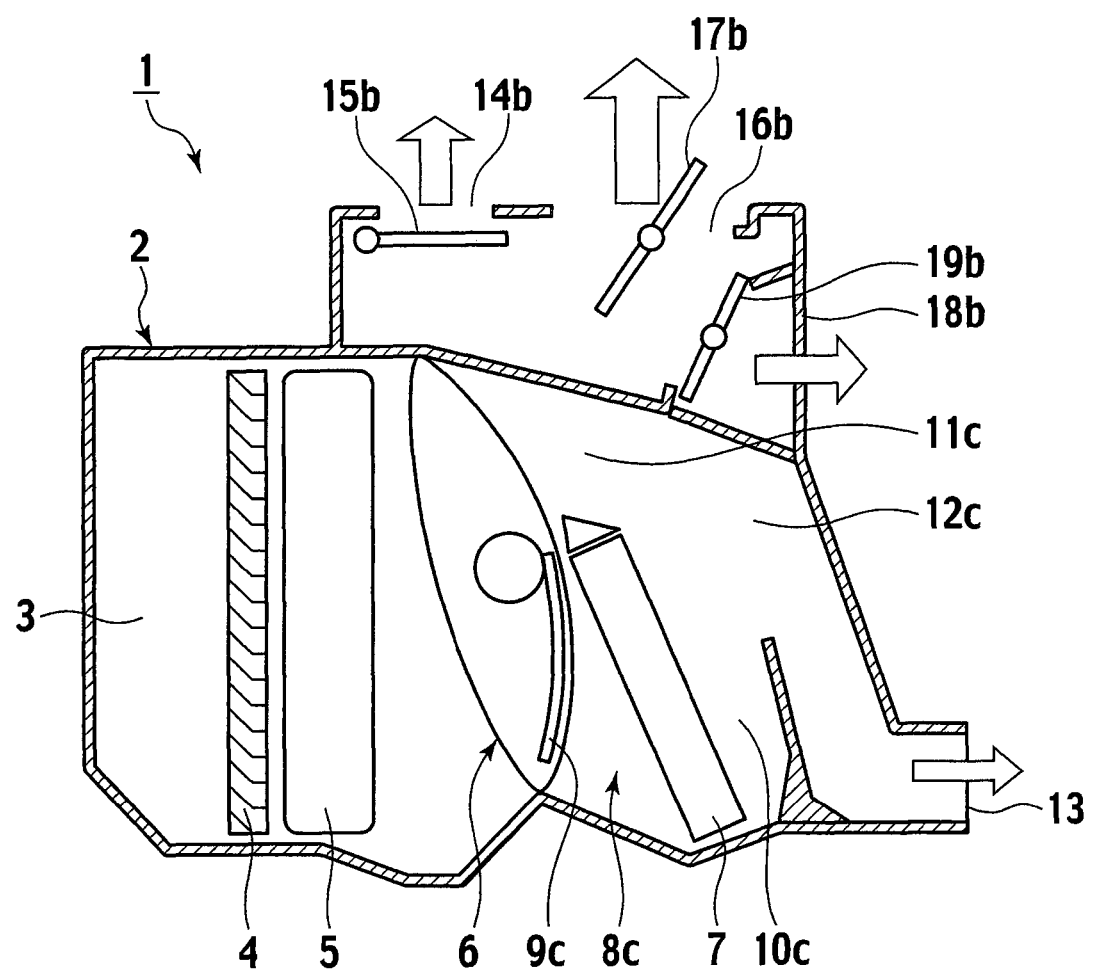
FIG. 4 is a sectional view taken along the line A-A in FIG. 3.
Figure 5:
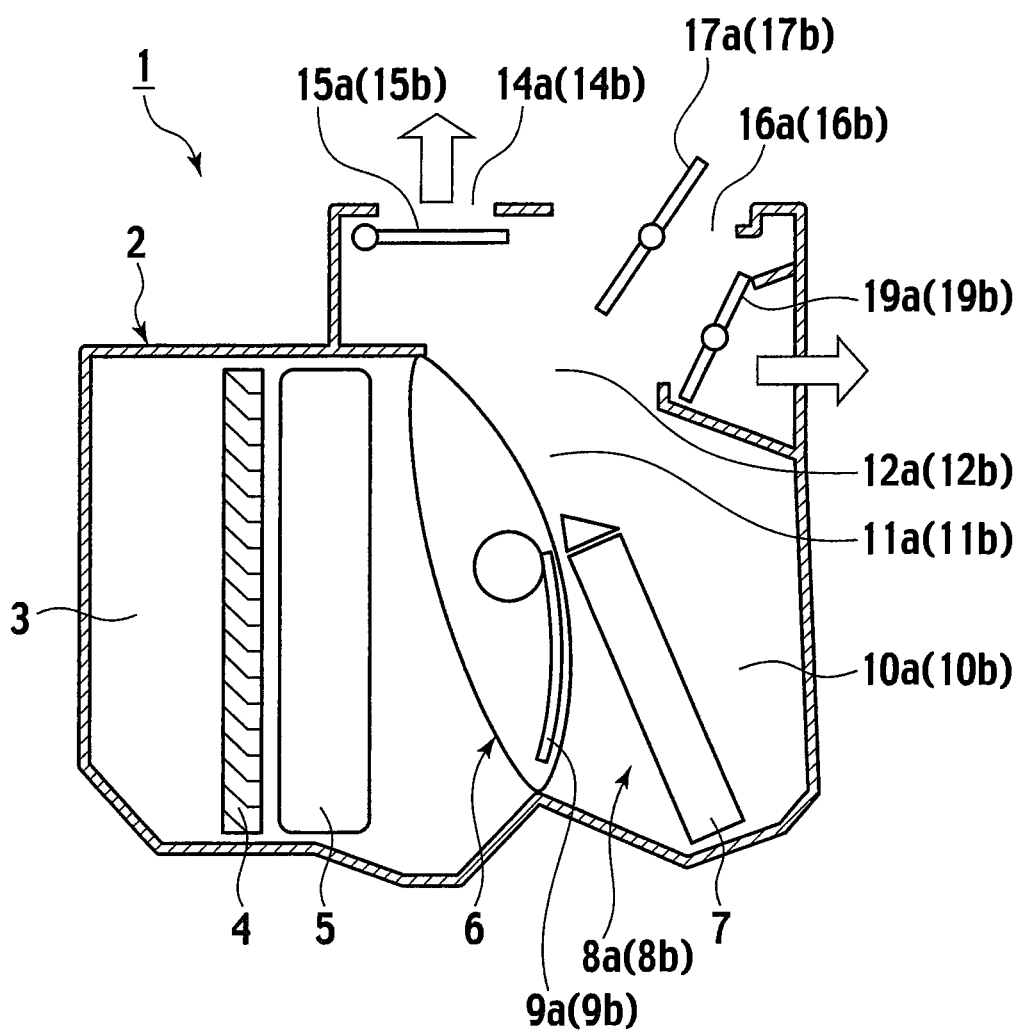
FIG. 5 is a sectional view taken along the line B-B (or C-C) in FIG. 3.

As shown in FIGS. 3 to 5, the air conditioning unit 2 includes a draft duct 3 therein. An air filter 4, an evaporator 5, an air mix door box 6, and a heater core 7 are placed in this order in the draft duct 3 from the upstream side in the air-blowing direction.

The air filter 4 traps and removes dust in the air. The evaporator 5 cools air to obtain cool air. The heater core 7 heats air to obtain warm air.

A portion of the draft duct 3 downstream from the position of an air mix door box 6 (upstream of the heater core 7) is divided into three in a direction orthogonal to the air-blowing direction, to form divided passages. Of the three divided passages, the left one is a left front-seat passage 8a, the right one is a right front-seat passage 8b, and the central one is a back seat passage 8c. FIG. 4 is a sectional view at the position of the back seat passage 8c. FIG. 5 is a sectional view at the position of the left front-seat passage 8a (or at the position of the right front-seat passage 8b).

The left front-seat passage 8a, the right front-seat passage 8b, and the back seat passage 8c are respectively provided with warm air passages 10a, 10b, and 10c that pass through the heater core 7, and with cool air passages 11a, 11b, and 11a that bypass the heater core 7.

Air mix doors 9a, 9b, and 9c control a ratio between an amount of air that passes through the warm air passages 10a, 10b, and 10c and an amount of air that passes through the cool air passages 11a, 11b, and 11c. The air mix doors 9a, 9b, and 9c are provided in an air mix door box 6 so as to correspond to the left front-seat passage 8a, the right front-seat passage 8b, and the back seat passage 8c, respectively. These three air mix doors 9a, 9b, and 9c are of slide type, and can be driven independently from each other. When the positions of the air mix doors 9a, 9b, and 9c are changed, distribution of air is controlled. A detailed structure of a drive system thereof will be described below.

Figure 7:
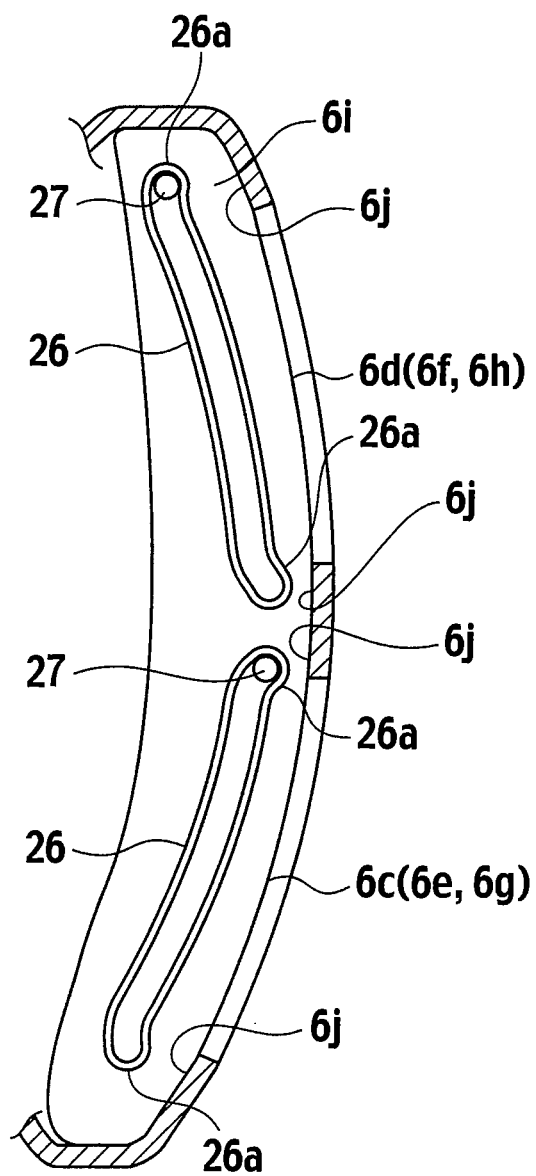
FIG. 7 is a sectional view taken along the line D-D (or E-E or F-F) in FIG. 6.

The air mix door box 6 is provided between the evaporator 5 and the heater core 7. One opening (not shown) is formed in the air mix door box 6 on a side opposed to the evaporator 5, and six openings 6c to 6h are formed in the air mix door box 6 on the other side (downstream side in the air-blowing direction). In the present embodiment, a pair of openings 6c and 6d is formed at the left front-seat passage 8a, a pair of openings 6g and 6h is formed at the right front-seat passage 8b, and a pair of openings 6e and 6f is formed at the back seat passage 8c. The three lower openings 6c, 6g, and 6e are formed at the warm air passages 10a, 10b, and 10c that pass through the heater core 7, respectively. The three upper openings 6d, 6h, and 6f are formed at the cool air passages 11a, 11b, and 11c that bypass the heater core 7, respectively. As shown in FIG. 7, the air mix door box 6 is provided with inner walls 6i that project inward of the air mix door box 6 from the openings 6c to 6h (upstream side in the air-blowing direction), respectively. The inner walls 6i are provided with a pair of upper and lower cam grooves 26, respectively.

Figure 8:
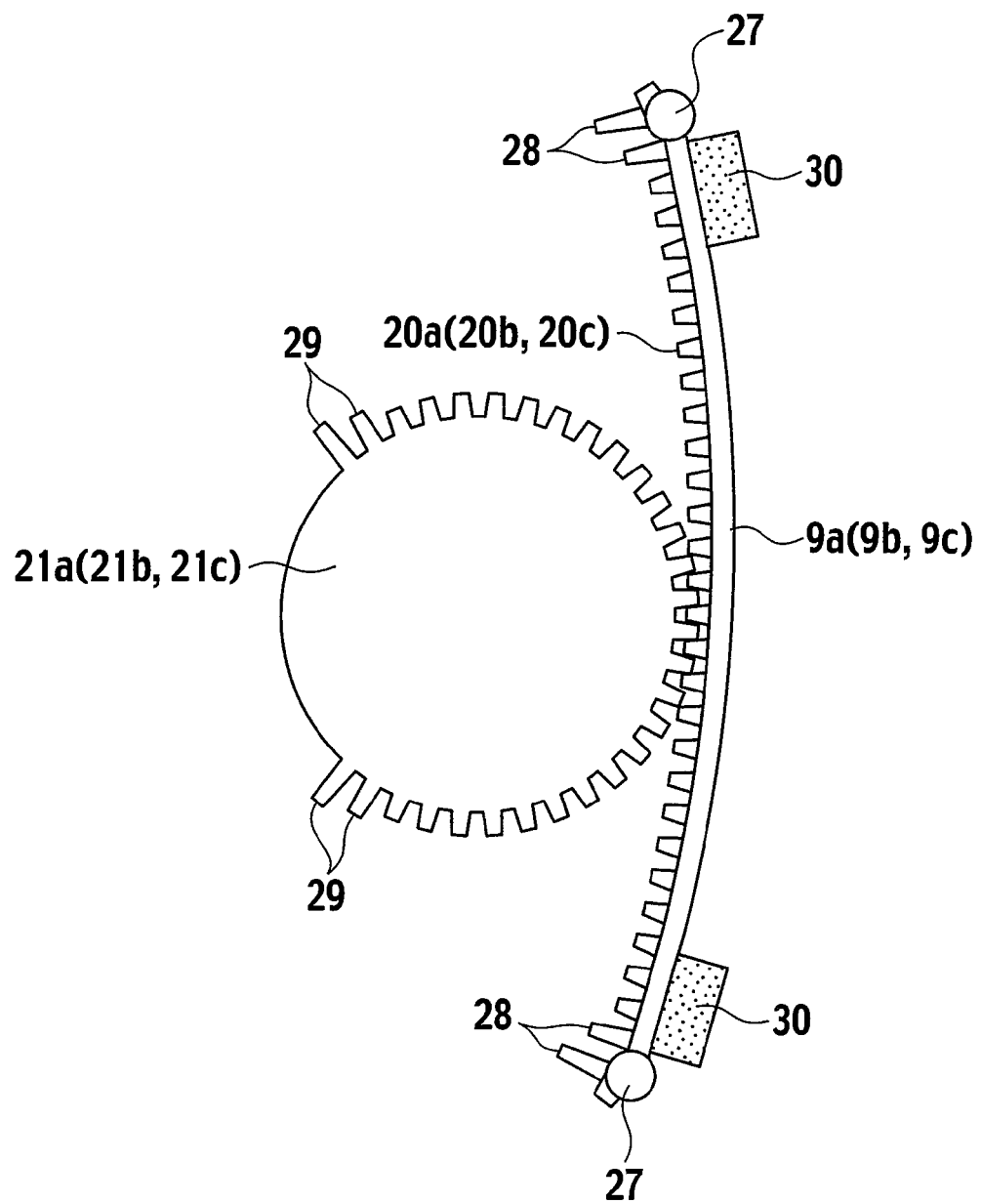
FIG. 8 is a side view of an air mix door according to the first embodiment.

As shown in FIG. 8, seal members 30 made of foam urethane or the like are adhered to the outer surfaces (downstream side in the air-blowing direction) of the air mix doors 9a, 9b, and 9c. Racks 20a, 20b, and 20c are continuously formed from upper ends to lower ends on inner surfaces (upstream side in the air-blowing direction) of the air mix doors 9a, 9b, and 9c, respectively. Slide pins 27 project from upper and lower four side ends of the air mix doors 9a, 9b, and 9c. The slide pins 27 are slidably inserted into the pair of cam grooves 26 formed in the inner walls 6i of the air mix door box 6. In some cases, the slide pins 27 can be columnar rollers that roll.

Air mix areas 12a, 12b, and 12c are formed on downstream sides of the warm air passages 10a, 10b, and 10c and the cool air passages 11a, 11b, and 11c of the three divided passages, respectively. As shown in FIG. 4, a back seat blow opening 13 is formed in the central back seat passage 8c at a location facing the air mix area 12c. Defroster blow openings 14a and 14b, defroster doors 15a and 15b for opening and closing the openings 14a and 14b, vent blow openings 16a and 16b, vend doors 17a and 17b for opening and closing the openings 16a and 16b, foot blow openings 18a and 18b, and foot doors 19a and 19b for opening and closing the openings 18a and 18b are respectively provided at positions facing the air mix areas 12a and 12b of the left front-seat passage 8a and the right front-seat passage 8b.

Next, drive systems of the three air mix doors 9a, 9b, and 9c will be explained.

Figure 9:
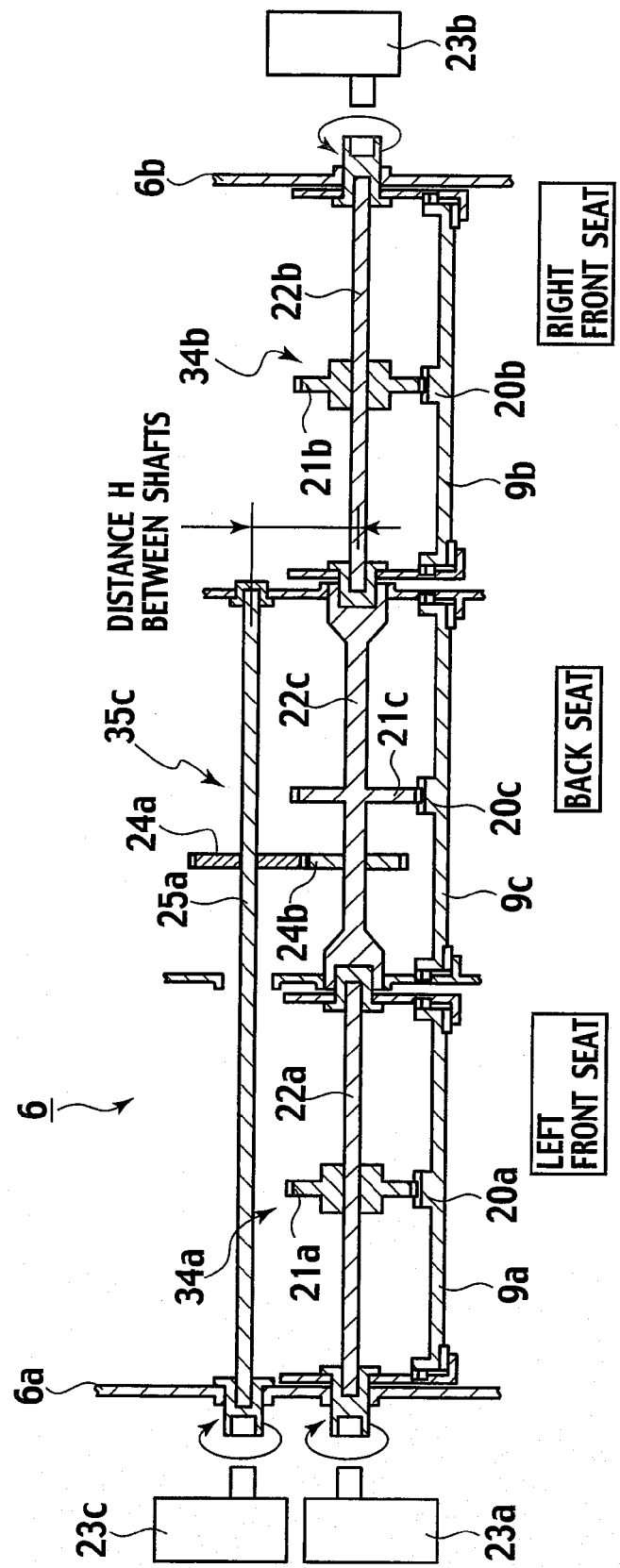
FIG. 9 is a sectional view of the air mix door box, showing a drive system of the air mix door according to the first embodiment.
Figure 10:
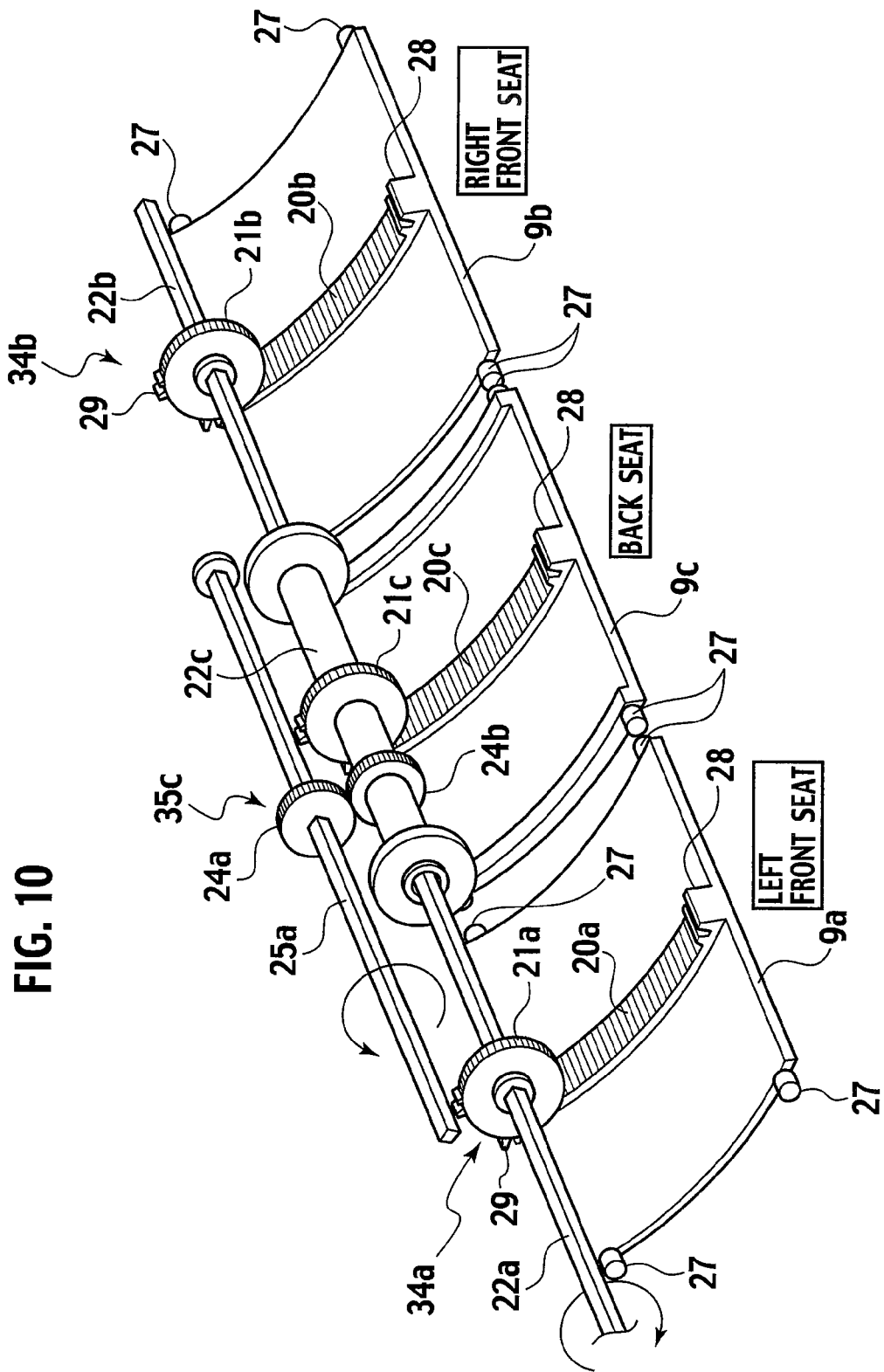
FIG. 10 is a perspective view of relevant parts of the drive system of the air mix door according to the first embodiment.

The left air mix door 9a for the left front seat is driven by a slide system (first slide system) 34a. More specifically, as shown in FIGS. 9 and 10, the slide system 34a includes a drive gear (first drive gear) 21a that meshes with the rack 20a provided on the air mix door 9a, and a first support shaft (support shaft) 22a that supports the drive gear 21a. The first support shaft 22a has a connection projecting outward from a left wall 6a of the air mix door box 6. When the first support shaft 22a is rotated by the first actuator 23a connected to the first support shaft 22a, the air mix door 9a is slid.

The right air mix door 9b for the right front seat is driven by a slide system (first slide system) 34b. More specifically, the slide system 34b includes a drive gear (first drive gear) 21b that meshes with the rack 20b provided on the air mix door 9b, and a second support shaft (support shaft) 22b that supports the drive gear 21b. The second support shaft 22b has a connection projecting outward from a right wall 6b of the air mix door box 6. When the second support shaft 22b is rotated by the second actuator 23b connected to the second support shaft 22b, the air mix door 9b is slid.

The central air mix door 9c for the back seat is driven by a slide system (second slide system) 35c. More specifically, the slide system 35c includes a drive gear (second drive gear) 21c that meshes with the rack 20c provided on the air mix door 9c, and a third support shaft (support shaft) 22c that supports the drive gear 21c. The third support shaft 22c is coaxial with the first support shaft 22a and the second support shaft 22b. The slide system 35c also includes an auxiliary gear (first auxiliary gear) 24b supported by the third support shaft 22c, an auxiliary gear (second auxiliary gear) 24a that meshes with the auxiliary gear 24b, and an auxiliary support shaft 25a that supports the auxiliary gear 24a and that has a connection projecting outward from the left wall 6a of the air mix door box 6. When the auxiliary support shaft 25a is rotated by the third actuator 23c connected to the auxiliary support shaft 25a, the third support shaft 22c is rotated, so that the air mix door 9c is slid.

In the first embodiment, the auxiliary support shaft 25a is placed such that its axial direction is parallel to the axial directions of the first to third support shafts 22a to 22c. With this structure, the auxiliary gear 24a and the auxiliary gear 24b easily mesh with each other, and the slide system 35c is assembled easily. In the first embodiment, the auxiliary gear 24a and the auxiliary gear 24b are formed with the same gear structure. As a result, the rotation amount of the auxiliary support shaft 25a and the rotation amount of the third support shaft 22c caused by rotation of the auxiliary support shaft 25a become the same. Therefore, when the gears having the same structure are used as the drive gears 21a to 21c, the slide amounts of the air mix doors 9a, 9b, and 9c obtained when the first to third support shafts 22a to 22c are rotated by the same amount can be the same.

As shown in FIG. 7, the cam groove 26 has substantially the same radius of curvature as that of the air mix door 9a (9b, 9c), the cam groove 26 supports the four slide pins 27 of the air mix door 9a (9b, 9c), and the cam groove 26 operates without rattling even when the air mix door 9a (9b, 9c) receives wind pressure. As the cam grooves 26, a pair of upper and lower cam grooves in the form of arc is recessed in the left and right inner walls 6i. The upper slide pin 27 is inserted into the upper cam groove 26, and the lower slide pin 27 is inserted into the lower cam groove 26. A terminal end 26a of each of the cam grooves 26 is bent diagonally rearward (toward the downstream side), and the air mix door 9a (9b, 9c) moves diagonally rearward from a direction intersecting with a slide direction at the terminal end position of a sliding motion, i.e., in a predetermined arc slide direction in the illustrated embodiment.

Accordingly, the seal members 30 abut against upper or lower peripheral edges 6j of the openings 6c and 6d (6g and 6h or 6e and 6f) of the air mix door box 6 and pressured, so that the sealing ability is enhanced. More specifically, the seal members 30 are not always in abutment against the upper or lower peripheral edges 6j, and abut against them only when necessary. This prevents the sealing ability from being deteriorated for a long term, and the sealing ability is enhanced. Further, there is no friction when the doors are operated, and operating force is preferably small.

In the first embodiment, because the air mix door 9a (9b, 9c) is moved in a direction intersecting with the sliding direction at the terminal end position of the sliding motion, high teeth 29 that are higher than other teeth are formed on ends of the drive gear 21a (21b, 21c) that mesh with the rack 20a (20b, 20c) of the air mix door 9a (9b, 9c) and near the ends, as shown in FIG. 8. By rotating the drive gear 21a (21b, 21c), the high teeth 29 press the air mix door 9a (9b, 9c) through the rack 20a (20b, 20c) formed on the air mix door 9a (9b, 9c) to move the air mix door along the cam groove 26.

As shown in FIG. 8, teeth of upper and lower ends or teeth near the ends of the rack 20a (20b, 20c) formed on the air mix door 9a (9b, 9c) are high teeth 28 that are higher than other teeth. More specifically, radii from the rotational center to the teeth tips at the end of the rack 20a (20b, 20c) are gradually changed. Accordingly, the teeth 28 reliably mesh with the high teeth 29 provided on the drive gear 21a (21b, 21c), and the air mix door 9a (9b, 9c) moves along the cam groove 26.

In the first embodiment, as shown in FIG. 11(a), the auxiliary gear 24a and the auxiliary support shaft 25a are placed at locations adjacent to the rack 20c of the air mix door 9c.

In this structure, air introduced into the air conditioning unit 2 passes through the air filter 4 and the evaporator 5, and air that passed through the evaporator 5 is branched into the left front-seat passage 8a, the right front-seat passage 8b, and the back seat passage 8c. The branched air passes through the warm air passages 10a, 10b, and 10c and the cool air passages 11a, 11b, and 11c according to the air distribution ratios of the air mix doors 9a, 9b, and 9c. Warm air from the warm air passages 10a, 10b, and 10c and cool air from the cool air passages 11a, 11b, and 11c joins together in the air mix areas 12a, 12b, and 12c, resulting in conditioned air of a desired temperature.

The conditioned air from the left front-seat passage 8a and the right front-seat passage 8b is introduced into a desired outlet (not shown) from a selected blow opening 14a, 14b (or 16a, 16b, or 18a, 18b) and sent out into the vehicle room from the outlet (not shown). The conditioned air from the back seat passage 8c is introduced into a back seat outlet (not shown) from the back seat blow opening 13, and is sent out into the vehicle room from the outlet (not shown). With the above operation, the air conditioning operations can be carried out in the front seat left area, the front seat right area, and the back seat area in the vehicle room independently from each other.

In the air conditioner 1 for a vehicle, the air mix doors 9a and 9b on the both sides are driven by the drive gears 21a and 21b that mesh with the racks 20a and 20b provided on the air mix doors 9a and 9b, and by the slide systems 34a and 34b having the support shafts 22a and 22b that supports the drive gears 21a and 21b, respectively. The central air mix door 9c is driven by the slide system 35c having the drive gear 21c that meshes with the rack 20c provided on the air mix door 9c, the third support shaft 22c that supports the drive gear 21c and is coaxial with the first and second support shafts 22a and 22b, the auxiliary drive gear 24b supported by the third support shaft 22c, the auxiliary gear 24a that meshes with the auxiliary gear 24b, and the auxiliary support shaft 25a that supports the auxiliary gear 24a. Therefore, all of the drive gears 21a, 21b, and 21c and their support shafts 22a, 22b, and 22c can be placed on the same axis, and thus vertical positions of all of the air mix doors 9a, 9b, and 9c can be set to the same. Thus, the air conditioner 1 for a vehicle can be reduced in size.

In the first embodiment, the auxiliary gear 24a is placed at the location adjacent to the rack 20c of the air mix door 9c as shown in FIG. 11(a). More specifically, if the auxiliary gear 24a is placed on the opposite side of the air mix door 9c with respect to the drive gear 21c as shown in FIG. 11(b), the dimension of the air mix door box 6 in its thickness direction is increased. In the first embodiment, because the auxiliary gear 24a is located at the above-described position, the auxiliary gear 24a located on the opposite side of the air mix door 9c does not project toward the drive gear 21c so much, and the installment dimension D of the air mix door box 6 in its thickness direction can be reduced. This contributes to reduction in the thickness of the air conditioner 1 for a vehicle in the air-blowing direction.

In the present embodiment, because the auxiliary gear 24b supported by the third support shaft 22c meshes with the auxiliary gear 24a supported by the auxiliary support shaft 25a, a distance H between the third support shaft 22c and the auxiliary support shaft 25a can be reduced by making the diameter of the auxiliary gear 24b smaller than that of the drive gear 21c.

Second Embodiment

Figure 12:
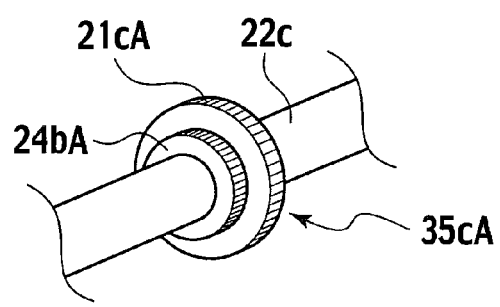
FIG. 12 is a perspective view of relevant parts of a support shaft provided with a second drive gear and a first auxiliary gear according to a second embodiment of the present invention.

FIG. 12 shows a second embodiment of the present invention. The air conditioner for a vehicle according to the second embodiment has the same constituent elements as those of the air conditioner for a vehicle according to the first embodiment. Therefore, like constituent elements are denoted by like reference numerals, and redundant explanations will be omitted.

The second embodiment is different from the first embodiment in the structure of the slide system (second slide system) 35cA, and remaining structures are basically the same.

More specifically, the slide system 35cA according to the second embodiment is integrally formed with a drive gear (second drive gear) 21cA supported by the third support shaft (support shaft) 22c, and an auxiliary gear (first auxiliary gear) 24bA.

In the second embodiment also, like the first embodiment, the auxiliary gear 24a and the auxiliary support shaft 25a are placed at locations adjacent to the rack 20c of the air mix door 9c.

With the present embodiment, the same effect as that of the first embodiment can be obtained.

Because the drive gear 21cA and the auxiliary gear 24bA are integrally formed, it is unnecessary to separately assemble the drive gear 21cA and the auxiliary gear 24bA, so that the productivity is enhanced. Because the positioning operation of the auxiliary gear 24a supported by the auxiliary support shaft 25a can be facilitated, the productivity is further enhanced.

Third Embodiment

Figure 13:
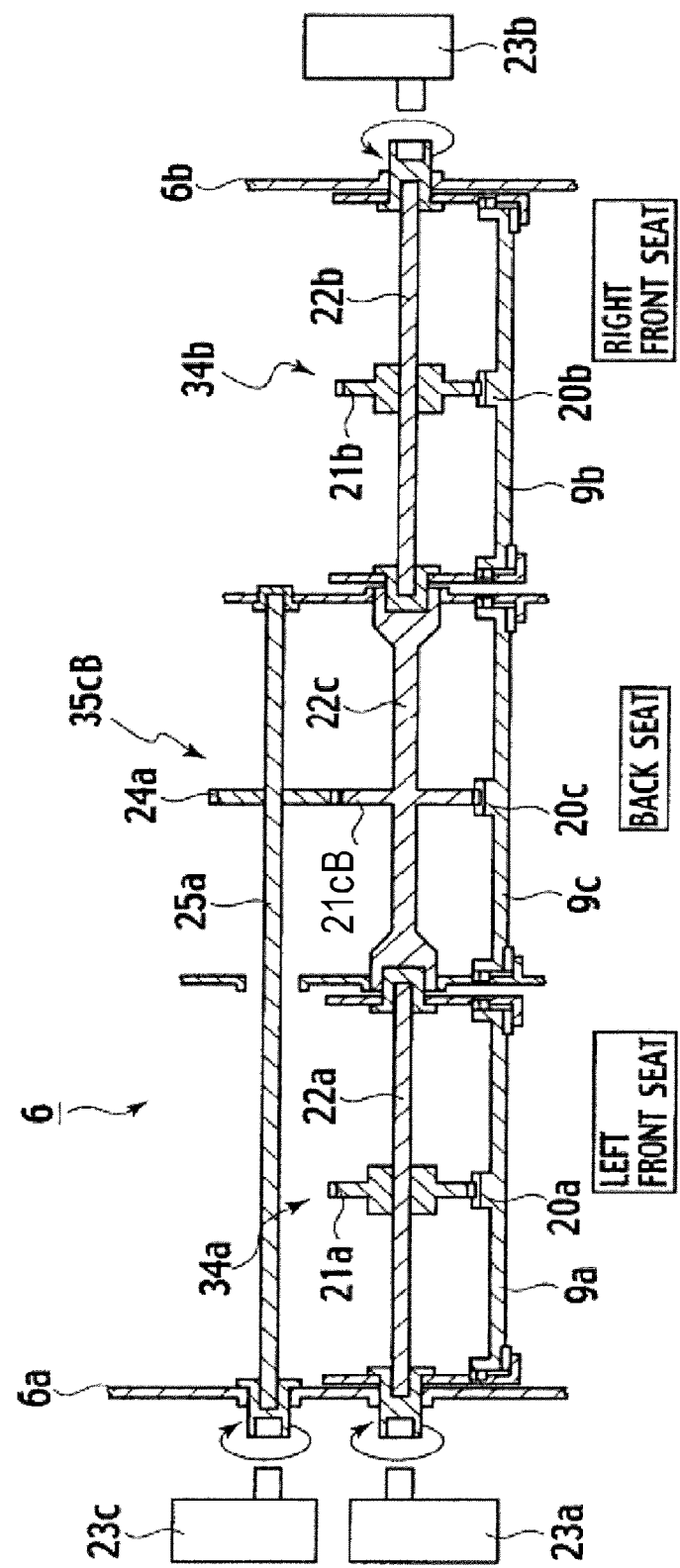
FIG. 13 is a sectional view of an air mix door box, showing a drive system of an air mix door according to a third embodiment of the present invention.
Figure 14:
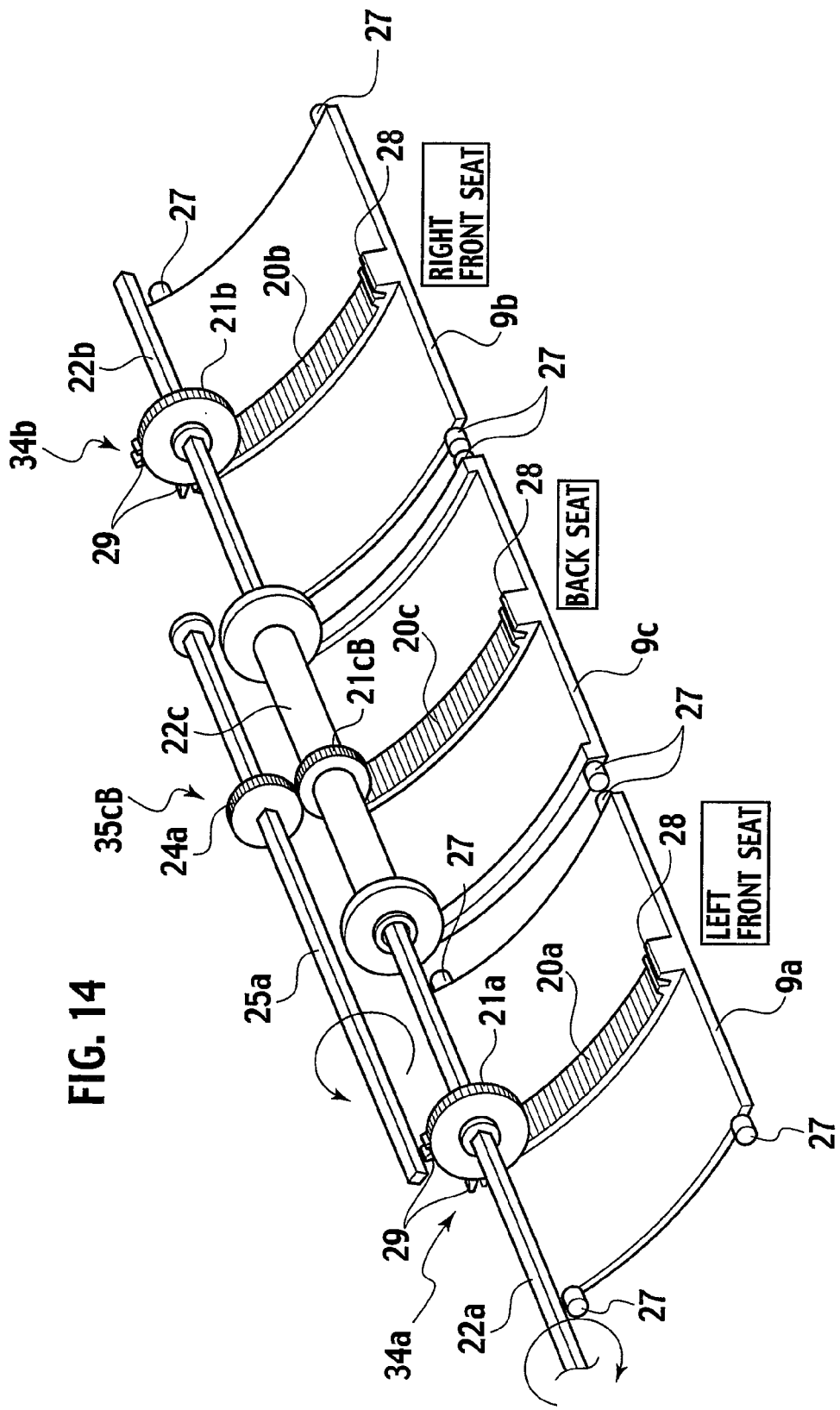
FIG. 14 is a perspective view of relevant parts of the drive system of the air mix door according to the third embodiment.
Figure 15:
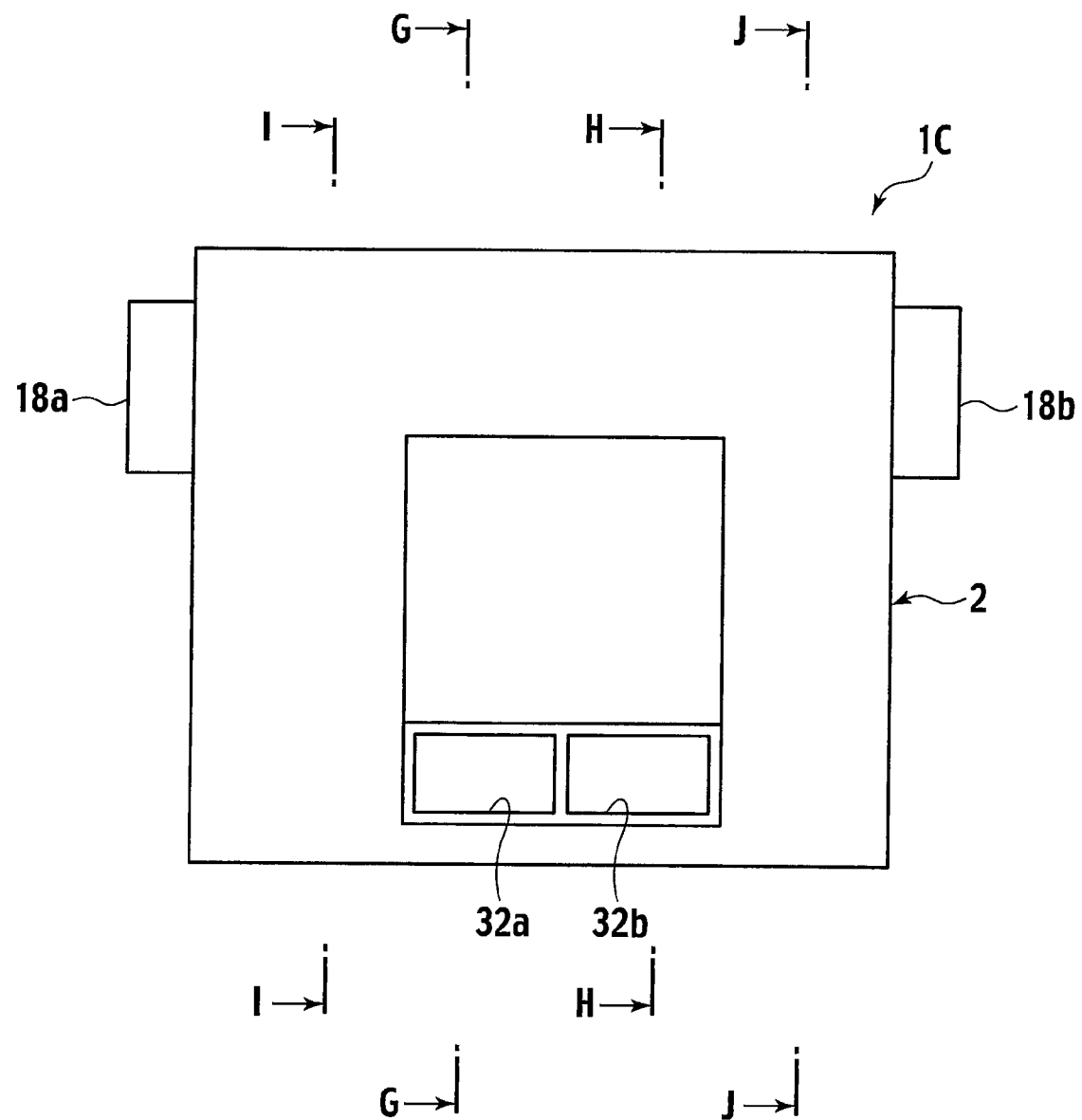
FIG. 15 shows an air conditioning unit according to a fourth embodiment of the present invention, as viewed from a vehicle room.

FIGS. 13 and 14 show a third embodiment of the present invention. The air conditioner for a vehicle according to the third embodiment has the same constituent elements as those of the air conditioner for a vehicle according to the first embodiment. Therefore, like constituent elements are denoted by like reference numerals, and redundant explanations will be omitted.

A slide system (second slide system) 35cB according to the third embodiment is different from that of the first embodiment in that a drive gear (second drive gear) 21cB also functions as the first auxiliary gear, teeth are provided over the whole circumference of the drive gear 21cB, and high teeth are not provided. Other structures are basically the same.

More specifically, as shown in FIGS. 13 and 14, the slide system 35cB according to the third embodiment includes the drive gear 21cB that meshes with the rack 20c provided on the air mix door 9c, a third support shaft (support shaft) 22c that supports the drive gear 21cB and is coaxial with the first support shaft 22a and the second support shaft 22b, an auxiliary gear (second auxiliary gear) 24a that meshes with the drive gear 21cB, and an auxiliary support shaft 25a that supports the auxiliary gear 24a and has a connection projecting outward from the left wall 6a of the air mix door box 6. When the auxiliary support shaft 25a is rotated by the third actuator 23c connected to the auxiliary support shaft 25a, the third support shaft 22c is rotated and the air mix door 9c slides.

In the third embodiment also, like the first embodiment, the auxiliary gear 24a and the auxiliary support shaft 25a are placed at locations adjacent to the rack 20c of the air mix door 9c.

Although the drive gear 21cB is not provided with high teeth in the present embodiment, when the drive gear (second drive gear) also functions as the first auxiliary gear and when the drive gear is provided with the high teeth, it is preferable that the teeth be provided on the whole circumference of the drive gear and that the high teeth be formed near both ends in the diameter of the drive gear. Accordingly, the drive gear meshes with the rack 20c on one side and meshes with the auxiliary gear 24a on the other side. Therefore, the drive gear having the high teeth can be rotated. Thus, the high teeth of the drive gear that rotates in unison with rotation of the auxiliary gear 24a press the air mix door 9c, which moves the air mix door 9c along the cam groove 26 more reliably.

With the present embodiment also, the same effect as that of the first embodiment can be obtained.

Because the drive gear 21cB also functions as the first auxiliary gear, it is possible to prevent the number of parts from increasing, and thus the productivity can be enhanced. As a result, the cost of the air conditioner can be reduced.

Fourth Embodiment

FIGS. 15 to 18 show a fourth embodiment of the present invention. The air conditioner for a vehicle according to the fourth embodiment has the same constituent elements as those of the air conditioner for a vehicle according to the third embodiment. Therefore, like constituent elements are denoted by like reference numerals, and redundant explanations will be omitted.

Figure 16:
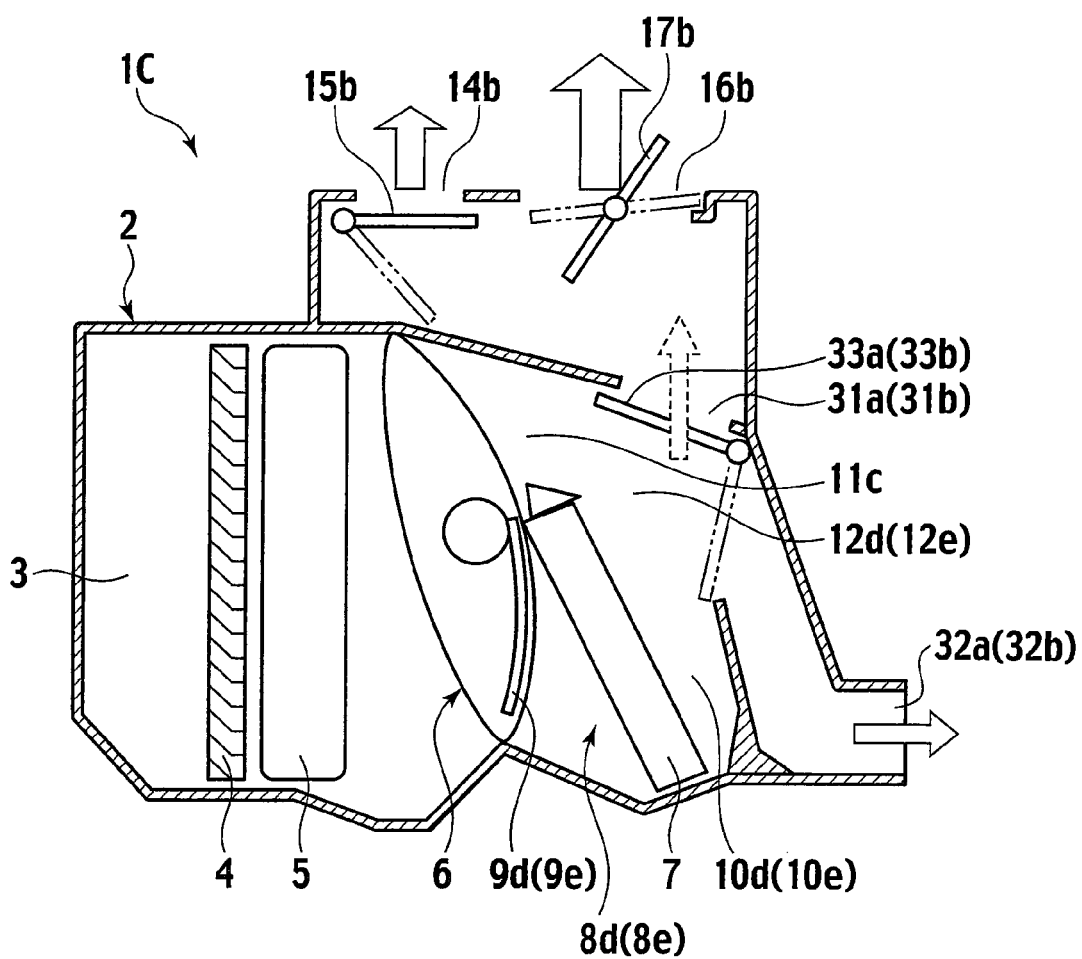
FIG. 16 is a sectional view taken along the line G-G (or H-H) in FIG. 15.
Figure 17:
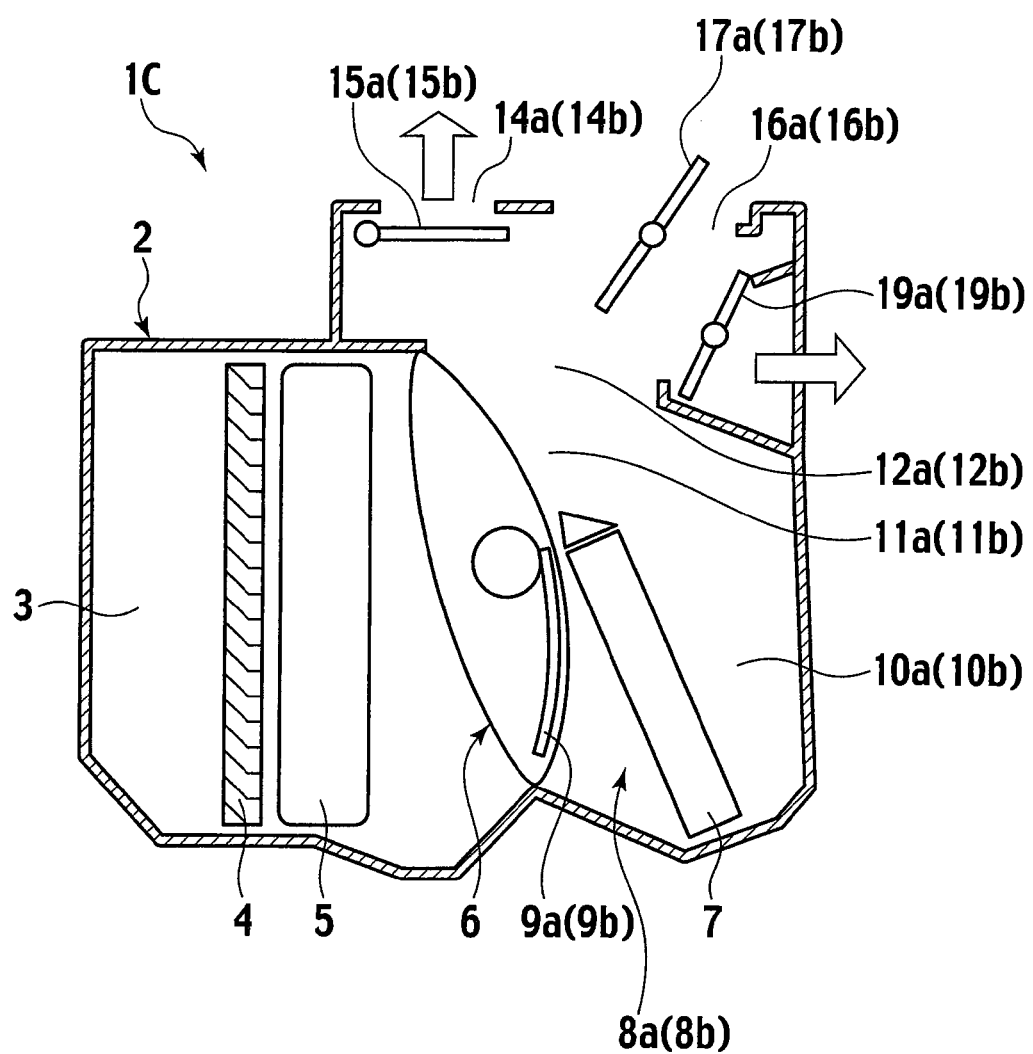
FIG. 17 is a sectional view taken along the line I-I (or J-J) in FIG. 15.

As shown in FIGS. 15 to 18, in the air conditioning unit 2 of an air conditioner 1C for a vehicle according to the fourth embodiment, as compared with that of the third embodiment, the inside draft duct 3 is divided into four in a direction orthogonal to the air-blowing direction. The four divided passages are a left-end passage 8a for the left front-seat, a right-end passage 8b for the right front-seat, a left-of-center passage 8d for the left back seat, and a right-of-center passage 8e for the right back seat. FIG. 16 is a sectional view at a location of the left back-seat passage 8d (or right back-seat passage 8e), and FIG. 17 is a sectional view at a location of the left front-seat passage 8a (or right front-seat passage 8b).

The air mix door box 6 includes four air mix doors 9a to 9e corresponding to the four divided passages, and a pair of upper and lower openings (not shown) corresponding to the air mix doors 9a to 9e. The four air mix doors 9a to 9e are of slide type, and they can be driven independently from each other. Detailed structures of drive systems thereof will be explained below.

As shown in FIG. 16, communication openings 31a and 31b that are in communication with the left front-seat passage 8a and the right front-seat passage 8b, a left back-seat blow opening 32a, a right back-seat blow opening 32b, and a front-seat precedence left switching door 33a and a front-seat precedence right switching door 33b for opening and closing the openings 31a, 31b, 32a, and 32b are provided at locations facing the air mix areas 12d and 12e of the left back-seat passage 8d and the right back-seat passage 8e at the center.

The front-seat precedence left switching door 33a and the front-seat precedence right switching door 33b are integrally driven. In an all seat blowing mode, the front-seat precedence left switching door 33a and the front-seat precedence right switching door 33b are located at positions for closing the communication openings 31a and 31b. In a front-seat precedence blowing mode (defroster mode or mode in a case in which no passenger is on the back seat), the front-seat precedence left switching door 33a and the front-seat precedence right switching door 33b are located at positions for closing the left back-seat blow opening 32a and the right back-seat blow opening 32b.

Next, the drive systems of the four air mix doors 9a to 9e will be explained.

Figure 18:
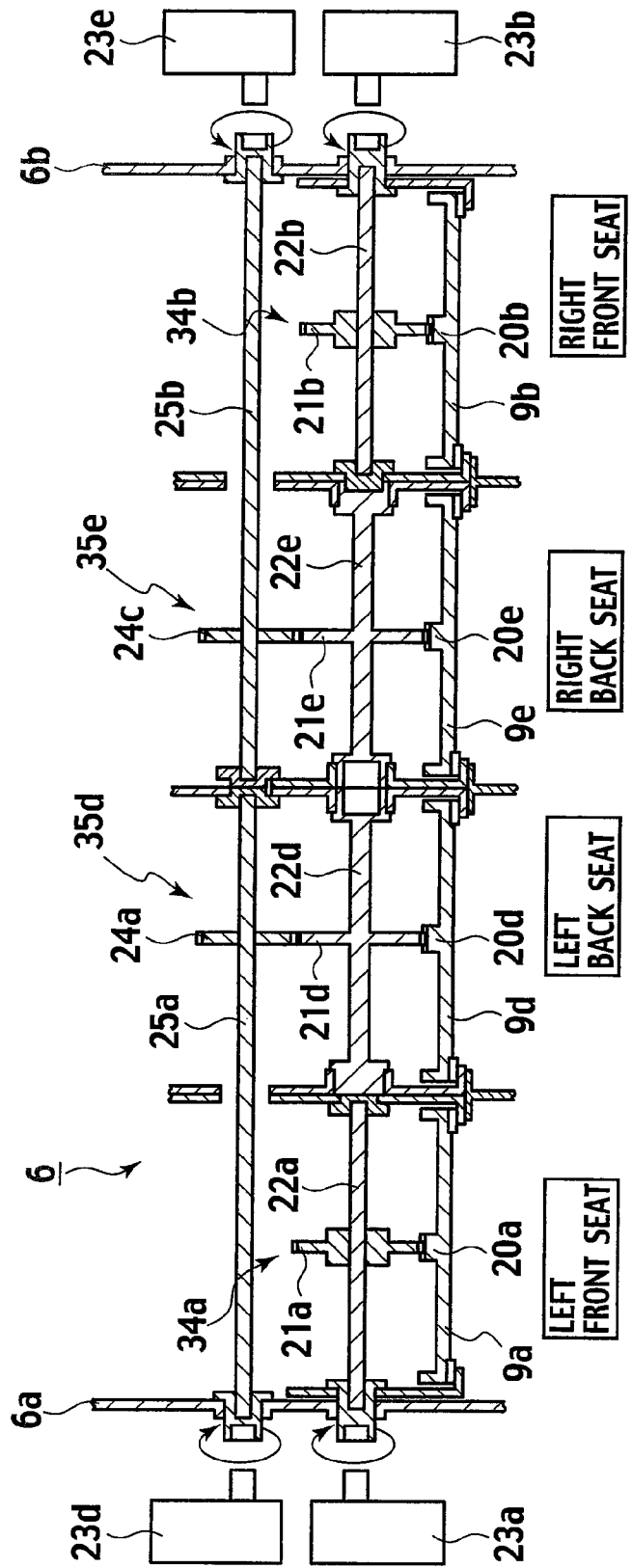
FIG. 18 is a sectional view of an air mix door box, showing a drive system of an air mix door according to the fourth embodiment.

The left air mix door 9a for the left front seat is driven by the slide system (first slide system) 34a. More specifically, as shown in FIG. 18, the slide system 34a includes the drive gear (first drive gear) 21a that meshes with the rack 20a provided on the air mix door 9a, and the first support shaft (support shaft) 22a that supports the drive gear 21a and has a connection projecting outward from the left wall 6a of the air mix door box 6. By rotating the first support shaft 22a by the first actuator 23a connected to the first support shaft 22a, the air mix door 9a is slid.

The right air mix door 9b for the right front seat is driven by the slide system (first slide system) 34b. More specifically, the slide system 34b includes the drive gear (first drive gear) 21b that meshes with the rack 20b provided on the air mix door 9b, and the second support shaft (support shaft) 22b that supports the drive gear 21b and has a connection projecting outward from the right wall 6b of the air mix door box 6. By rotating the second support shaft 22b by the second actuator 23b connected to the second support shaft 22b, the air mix door 9b is slid.

The left-of-center air mix door 9d for the left back seat is driven by a slide system (second slide system) 35d. More specifically, the slide system 35d includes a drive gear (second drive gear) 21d that meshes with the rack 20d provided on the air mix door 9d, a fourth support shaft (support shaft) 22d that supports the drive gear 21d and is coaxial with the first support shaft 22a and the second support shaft 22b, an auxiliary gear (second auxiliary gear) 24a that meshes with the drive gear 21d, and an auxiliary support shaft 25a that supports the auxiliary gear 24a and has a connection projecting outward from the left wall 6a of the air mix door box 6. When the auxiliary support shaft 25a is rotated by a fourth actuator 23d connected to the auxiliary support shaft 25a, the fourth support shaft 22d rotates and the air mix door 9d is slid.

The right-of-center air mix door 9e for the right back seat is driven by a slide system (second slide system) 35e. More specifically, the slide system 35e includes a drive gear (second drive gear) 21c that meshes with the rack 20e provided on the air mix door 9e, a fifth support shaft (support shaft) 22e that supports the drive gear 21e and is coaxial with the first support shaft 22a and the second support shaft 22b, an auxiliary gear (second auxiliary gear) 24c that meshes with the drive gear 21e, and an auxiliary support shaft 25b that supports the auxiliary gear 24c and has a connection projecting outward from the right wall 6b of the air mix door box 6. When the auxiliary support shaft 25b is rotated by a fifth actuator 23e connected to the auxiliary support shaft 25b, the fifth support shaft 22e rotates and the air mix door 9e is slid. Like the third embodiment, the auxiliary gears 24a and 24c, and their auxiliary support shafts 25a and 25b are placed at locations adjacent to the racks 20d and 20e of the air mix doors 9d and 9e.

In the present embodiment, the drive gears 21d and 21e function as the first auxiliary gear, but the first auxiliary gear may be provided separately as in the first and second embodiments, and the first auxiliary gear may mesh with the auxiliary gears 24a and 24c.

In the fourth embodiment also, the air conditioning operations can be carried out independently in the front seat left area, the front seat right area, the back seat left area, and the back seat right area in the vehicle room by the same action as the third embodiment. Because all of the drive gears 21a to 21e and the support shafts 22a to 22e can be coaxial, all of the air mix doors 9a to 9e can be set vertically at the same position. Therefore, the air conditioner 1C for a vehicle can be reduced in size.

According to the fourth embodiment, during the front-seat precedence blowing mode, conditioned air from the left backseat passage 8d and the right back-seat passage 8e is introduced into the left front-seat passage 8a and the right front-seat passage 8b through the corresponding communication openings 31a and 31b. Therefore, all air can be sent out toward the front seats.

Fifth Embodiment

Figure 19:
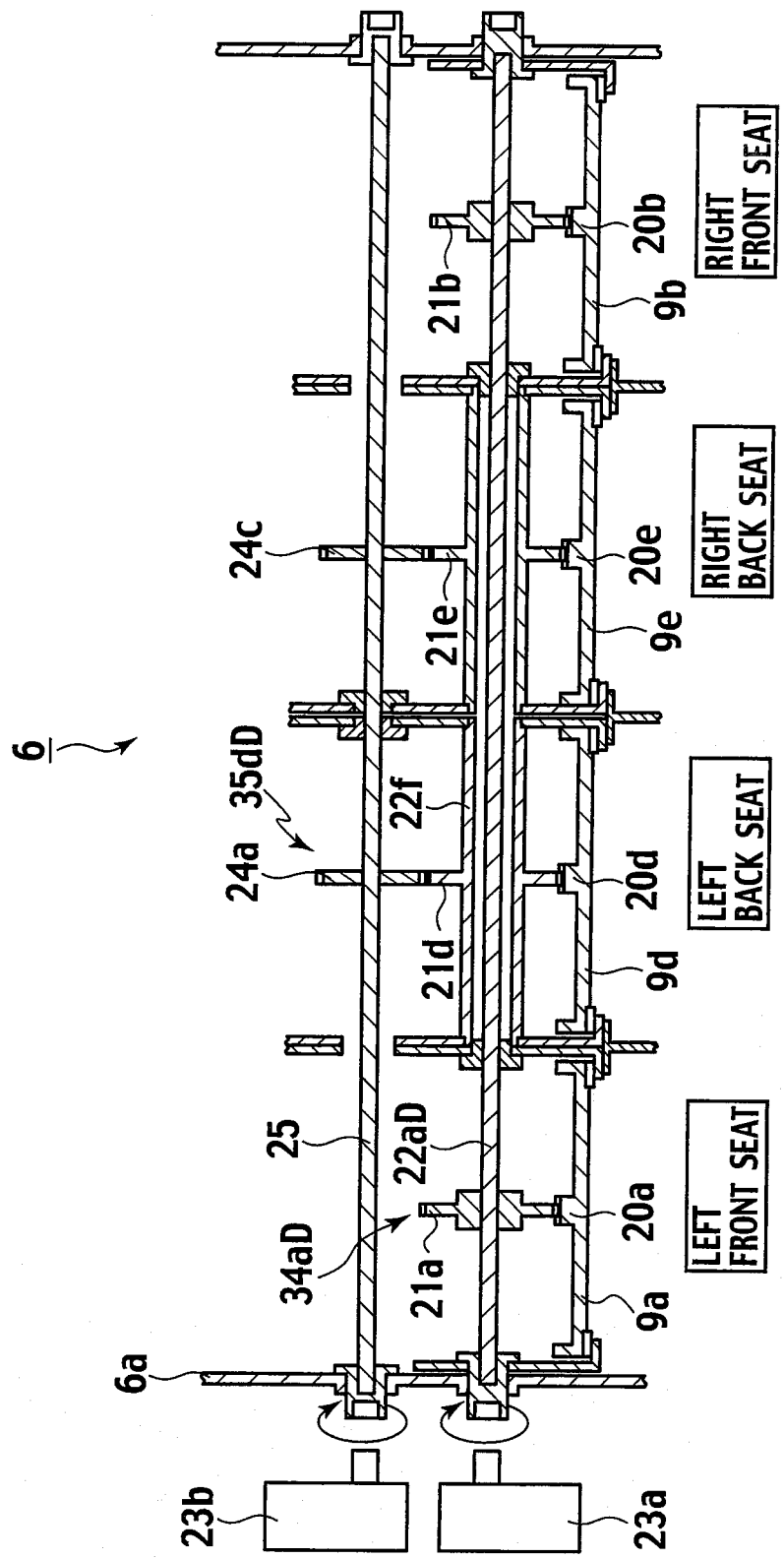
FIG. 19 is a sectional view showing a drive system of an air mix door according to a fifth embodiment of the present invention.

FIG. 19 shows a fifth embodiment of the present invention. An air conditioner for a vehicle according to the fifth embodiment has the same constituent elements as those of the air conditioner for a vehicle according to the fourth embodiment. Therefore, like constituent elements are denoted by like reference numerals, and redundant explanations will be omitted.

In the fifth embodiment, air conditioning operations in two areas of the front seat left and right areas and the back seat left and right areas are carried out independently from each other. As shown in FIG. 19, the left and right air mix doors 9a and 9b located at both end positions are driven by a slide system (first slide system) 34aD. More specifically, the slide system 34aD includes the drive gears (first drive gears) 21a and 21b that mesh with the racks 20a and 20b provided on the air mix doors 9a and 9b, and a solid support shaft (support shaft) 22a that supports the drive gears 21a and 21b and that passes through a hollow support shaft 22f (later described) and that has a connection projecting outward from the left wall 6a of the air mix door box 6. When the solid support shaft 22a is rotated by the first actuator 23a connected to the solid support shaft 22a, the air mix doors 9a and 9b are slid.

The two left and right air mix doors 9d and 9e at the center are driven by a slide system (second slide system) 35dD. More specifically, the slide system 35dD includes the drive gears (second drive gears) 21d and 21e that mesh with the racks 20d and 20e provided on the air mix doors 9d and 9e, and a hollow support shaft 22f that supports the drive gears 21d and 21e. The solid support shaft 22a passes through the hollow support shaft 22f. The slide system 35dD also includes the auxiliary gears 24a and 24c that mesh with the drive gears 21d and 21e, and an auxiliary support shaft 25 that supports both the auxiliary gears 24a and 24c and has a connection projecting outward from the left wall 6a of the air mix door box 6. When the auxiliary support shaft 25 is rotated by the second actuator 23b connected to the auxiliary support shaft 25, the drive gears 21d and 21e are rotated and the air mix doors 9d and 9e are slid. The auxiliary gears 24a and 24c and the auxiliary support shaft 25 are placed at locations adjacent to the racks 20d and 20e of the air mix doors 9d and 9e, like the third embodiment.

Although the drive gears 21d and 21e also function as the first auxiliary gear in the present embodiment, the first auxiliary gear may be provided separately and the first auxiliary gear may mesh with the auxiliary gears 24a and 24c like the first and second embodiments.

In the fifth embodiment, the air conditioning operations may be carried out in the front seat left and right areas and the back seat left and right areas in the vehicle room independently from each other. Both the first actuator 23a and second actuator 23b can be located on the left outer side of the air mix door box 6, which contributes to make the air conditioner for a vehicle compact. The first actuator 23a and the second actuator 23b may be located on the right outer side of the air mix door box 6.

The fifth embodiment can be obtained by adding a simple design change to the air conditioning unit 2 of the fourth embodiment.

Sixth Embodiment

Figure 20:
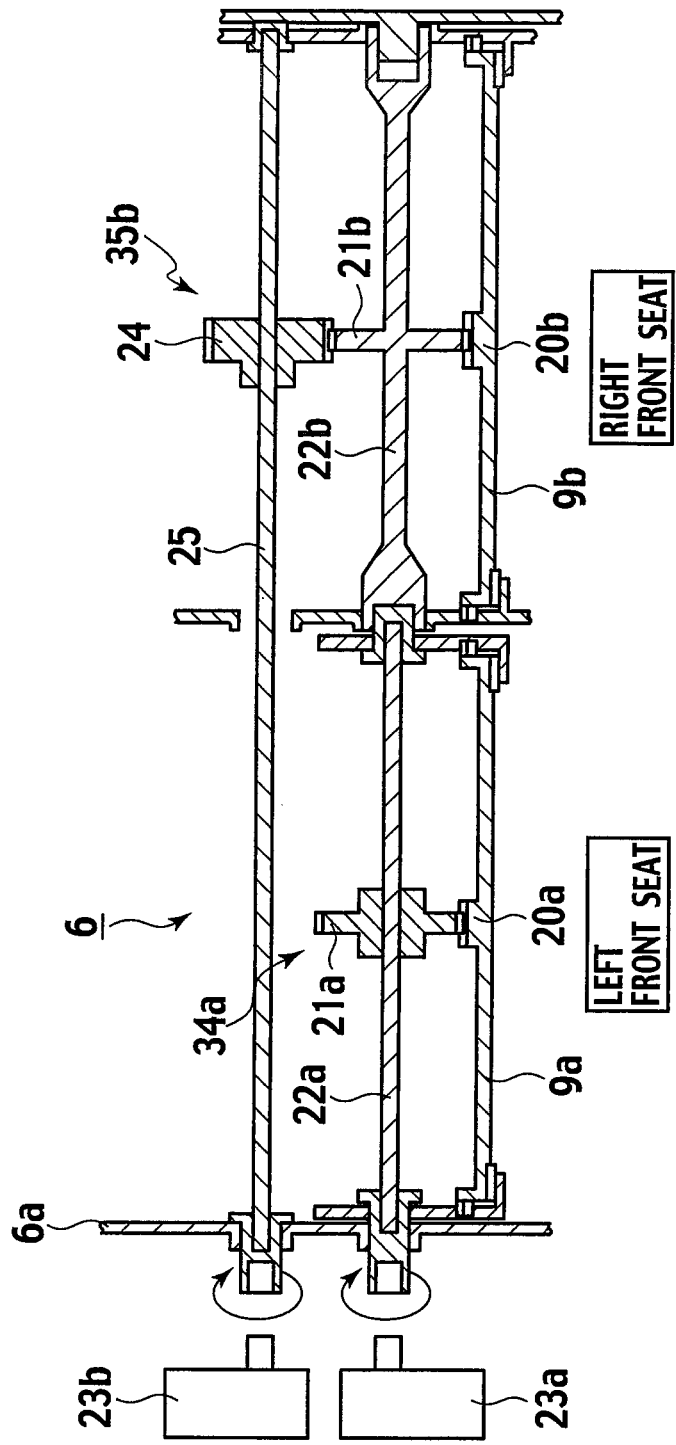
FIG. 20 is a sectional view showing a drive system of an air mix door according to a sixth embodiment of the present invention.

FIG. 20 shows a sixth embodiment of the present invention. An air conditioner for a vehicle according to the sixth embodiment has the same constituent elements as those of the air conditioner for a vehicle according to the third embodiment. Therefore, like constituent elements are denoted by like reference numerals, and redundant explanations will be omitted. In the sixth embodiment, the air conditioning operations are carried out in two areas of the front seat left area and the front seat right area independently from each other. As shown in FIG. 20, the left hand air mix door 9a for the left front seat is driven by the slide system (first slide system) 34a. More specifically, as show in FIG. 18, the slide system 34a includes the drive gear (first drive gear) 21a that meshes with the rack 20a provided on the air mix door 9a, and the first support shaft (support shaft) 22a that supports the drive gear 21a and has a connection projecting outward from the left wall 6a of the air mix door box 6. When the first support shaft 22a is rotated by the first actuator 23a connected to the first support shaft 22a, the air mix door 9a is slid.

A right hand air mix door 9b for the right front seat is driven by a slide system (second slide system) 35b. More specifically, the slide system 35b includes the drive gear (second drive gear) 21b that meshes with the rack 20b provided on the air mix door 9b, the second support shaft (support shaft) 22b that supports the drive gear 21b and is coaxial with the first support shaft 22a, an auxiliary gear (second auxiliary gear) 24 that meshes with the drive gear 21b, and the auxiliary support shaft 25 that supports the auxiliary gear 24 and has a connection projecting outward from the left wall 6a of the air mix door box 6. When the second actuator 23b connected to the auxiliary support shaft 25 rotates the auxiliary support shaft 25, the second support shaft 22b rotates, and the air mix door 9b is slid.

Although the drive gear 21b also functions as the first auxiliary gear in the present embodiment, the first auxiliary gear may be provided separately and the first auxiliary gear may mesh with the auxiliary gear 24, like the first and second embodiments.

In the sixth embodiment, the air conditioning operations can be carried out in the front seat left area and the front seat right area in the vehicle room independently from each other. Both of the first actuator 23a and the second actuator 23b can be located on the left outer side of the air mix door box 6, which contributes to make the air conditioner for a vehicle compact. The first actuator 23*a* and the second actuator 23*b* may be located on the right outer side of the air mix door box 6.

INDUSTRIAL APPLICABILITY

According to the present invention, it is possible to provide a small air conditioner for a vehicle capable of carrying out the air conditioning operations in a plurality of areas in a vehicle room independently from each other.

The invention claimed is:

1. An air conditioner for a vehicle, in which a draft duct in an air conditioning unit is divided into a plurality of divided passages upstream from a heater core, and the plurality of divided passages includes a plurality of warm air passages passing through the heater core, a plurality of cool air passages bypassing the heater core, and a plurality of air mix doors each controlling a ratio between an amount of air passing through one of the warm air passages and an amount of air passing through one of the cool air passages, the air conditioner comprising:
a first air mix door and a second air mix door included in the plurality of air mix doors;
a first slide system that includes a first drive gear meshed with a first rack on the first air mix door, a first support shaft on which the first drive gear is fixed, and a first actuator connected with the first support shaft, and that slides the first air mix door by rotating the first support shaft using the first actuator, a drive force of the first actuator transmitted to the first air mix door via the first support shaft, the first drive gear, and the first rack on the first air mix door in order of the first support shaft, the first drive gear, and the first rack; and
a second slide system that includes a second drive gear meshed with a second rack on the second air mix door, a second support shaft on which the second drive gear is fixed, a primary auxiliary gear fixed on the second support shaft, a secondary auxiliary gear meshed with the primary auxiliary gear, an auxiliary support shaft on which the secondary auxiliary gear is fixed, and a second actuator connected with the auxiliary support shaft, and that slides the second air mix door by rotating the auxiliary support shaft using the second actuator, a drive force of the second actuator transmitted to the second air mix door via the auxiliary support shaft, the secondary auxiliary gear, the primary auxiliary gear, the second support shaft, and the second rack on the second air mix door in order of the auxiliary support shaft, the secondary auxiliary gear, the primary auxiliary gear, the second support shaft, and the second rack, wherein the auxiliary support shaft is parallel to the first support shaft and the second support shaft and is not coaxial with the first support shaft and the second support shaft.

2. The air conditioner for a vehicle according to claim 1, wherein the second drive gear and the primary auxiliary gear are integrally formed as one member.

3. The air conditioner for a vehicle according to claim 1, wherein the second drive gear and the primary auxiliary gear are integrated as a single gear.

4. The air conditioner for a vehicle according to claim 1, wherein
the first drive gear and the second drive gear each includes teeth, and at least one of the teeth is made as a high tooth that has a greater height than a height of others of the teeth.

5. The air conditioner for a vehicle according to claim 2, wherein the first drive gear and the second drive gear each include teeth, and at least one of the teeth is made as a high tooth that has a greater height than a height of others of the teeth.

6. The air conditioner for a vehicle according to claim 3, wherein the first drive gear and the second drive gear each include teeth, and at least one of the teeth is made as a high tooth that has a greater height than a height of others of the teeth.

7. The air conditioner for a vehicle according to claim 1, wherein the first drive gear and the second drive gear each include teeth, and at least one of the teeth is made as a high tooth that has a greater height than a height of others of the teeth.

8. The air conditioner for a vehicle according to claim 1, wherein
the first support shaft and the second support shaft are sequentially aligned along a single straight line.

9. The air conditioner for a vehicle according to claim 1, wherein the second rack is at a center of the second air mix door along a slide direction of the second air mix door.

10. The air conditioner for a vehicle according to claim 9, wherein the first rack is at a center of the first air mix door along a slide direction of the first air mix door.

* * * * *